Aug. 28, 1934.  A. P. FOX  1,971,555
LUBRICATING APPARATUS
Filed Sept. 22, 1932  3 Sheets-Sheet 2
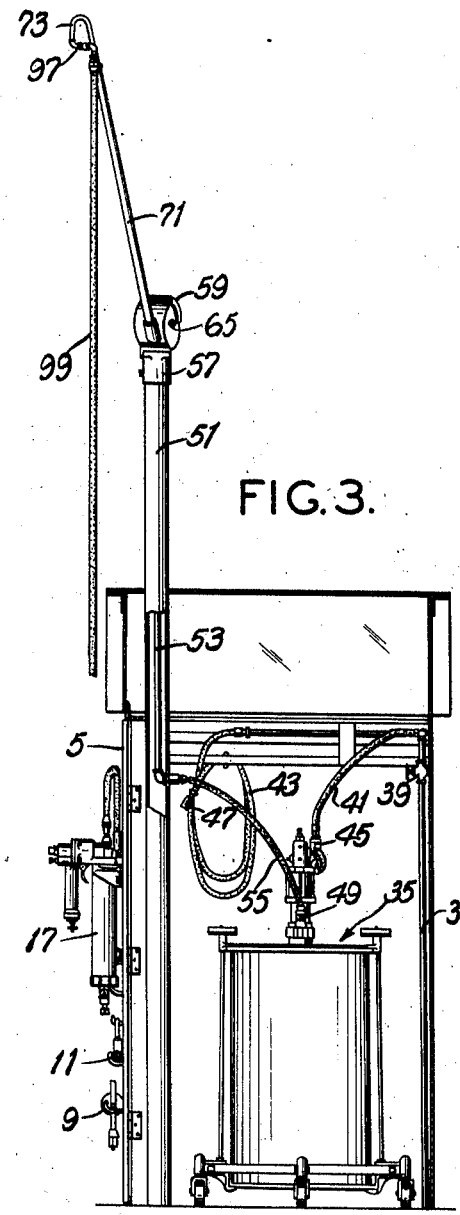
FIG. 3.
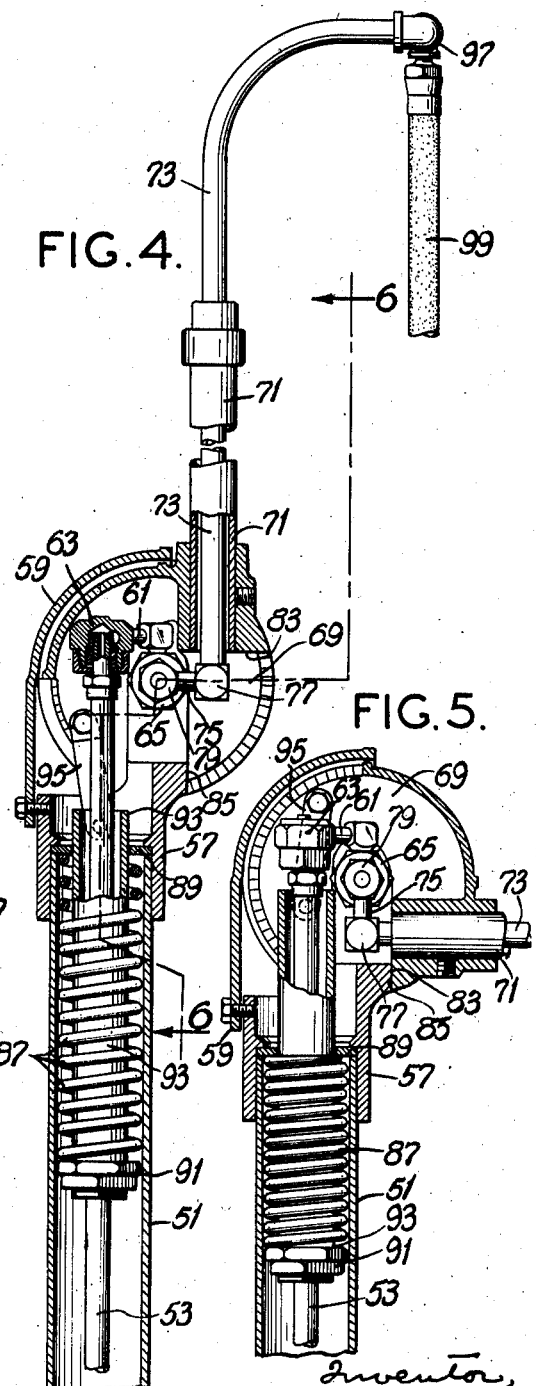
FIG. 4.
FIG. 5.
Inventor,
Alexander P. Fox.
Delos G. Haynes,
Attorney.

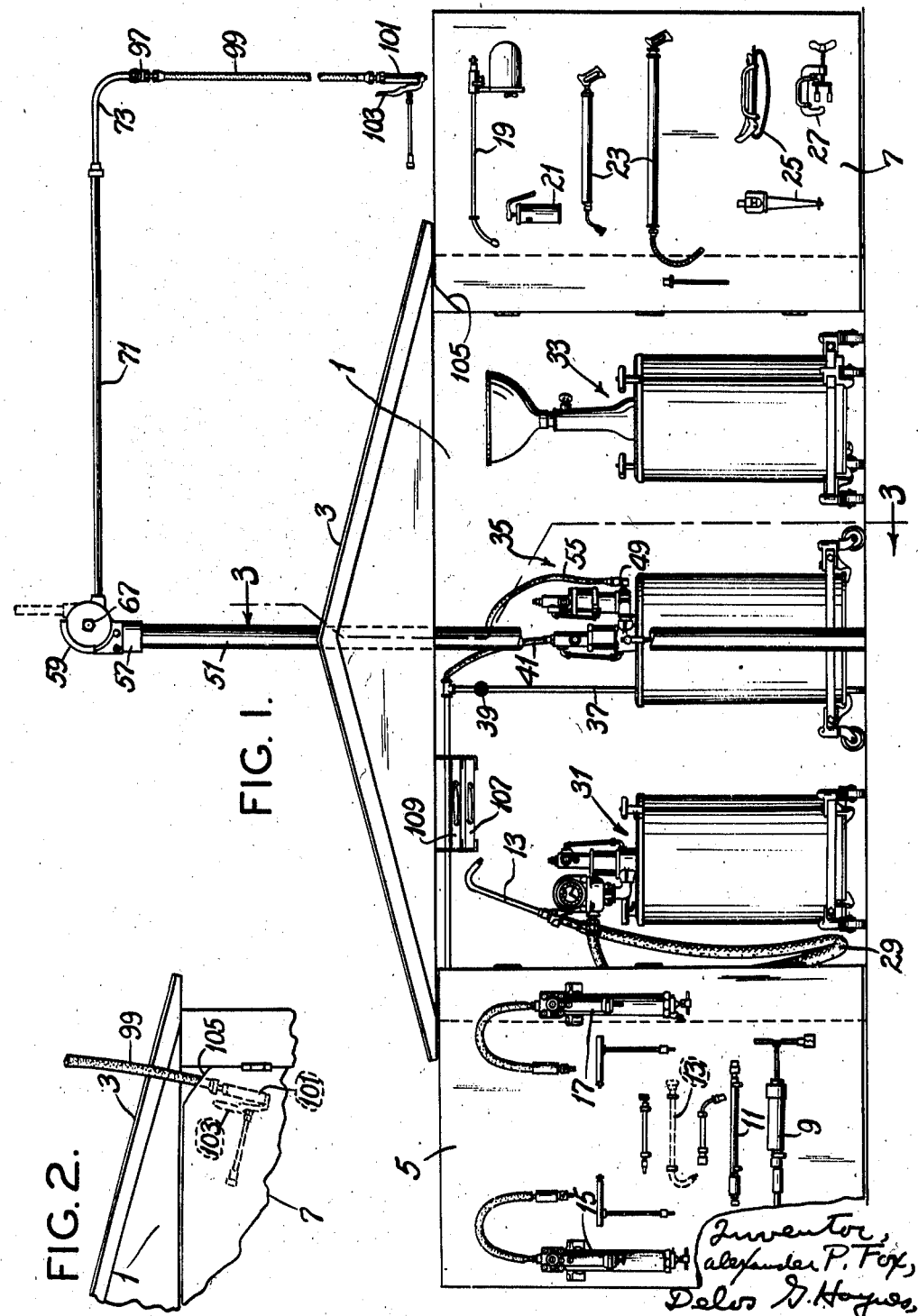

Patented Aug. 28, 1934

1,971,555

UNITED STATES PATENT OFFICE 1,971,555

LUBRICATING APPARATUS

Alexander P. Fox, University City, Mo., assignor to Lincoln Engineering Company, St. Louis, Mo., a corporation of Missouri Application September 22, 1932, Serial No. 634,289

7 Claims. (Cl. 221—47.1)

This invention relates to lubricating apparatus, and with regard to certain more specific features, to apparatus for housing lubricating equipment and for delivering lubricant to a suitable point of use.

Among the several objects of the invention may be noted the provision of a housing for lubricating apparatus which is equipped with suitable high-pressure connections and extensions for easily delivering such classes of lubricant to points of use; the provision of apparatus of the class described which shall house all apparatus at night or otherwise so that it cannot be tampered with or stolen, and the provision of apparatus of this class which is relatively simple in construction, neat in appearance, and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a front elevation of the apparatus, showing the doors thereof in open position;

Fig. 2 is a fragmentary view similar to Fig. 1, showing a door in shut position for enclosing a grease gun and other parts;

Fig. 3 is a vertical section taken through the apparatus substantially along line 3—3 of Fig. 1;

Fig. 4 is a detailed longitudinal section of a joint of a swiveling grease delivery tower;

Fig. 5 is a view similar to Fig. 4, showing an alternative position; and,

Similar reference characters indicate corresponding parts throughout the several views of the drawings.

Figure 6:
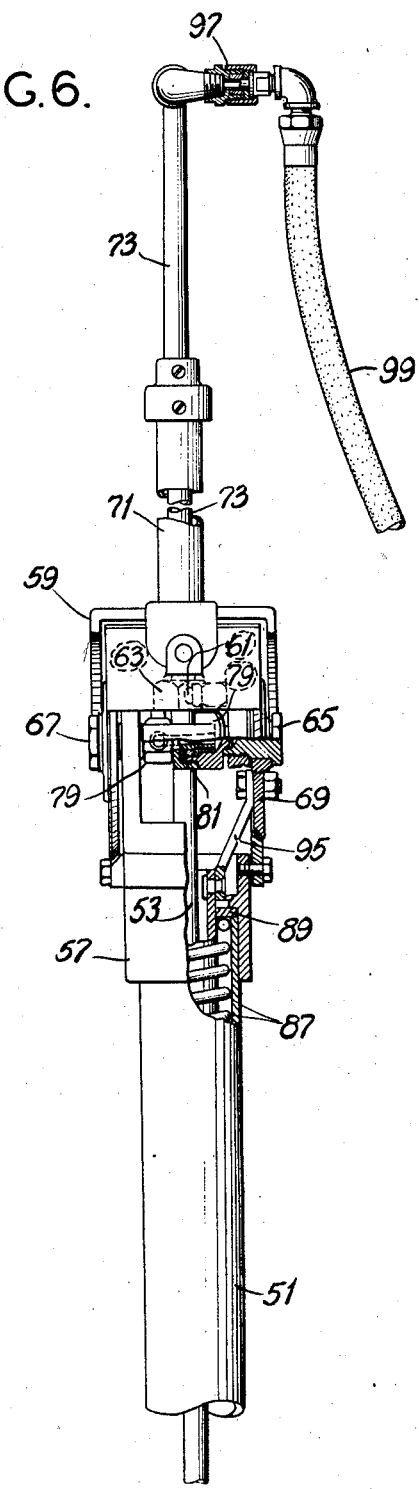
Fig. 6 is a vertical section taken on line 6—6 of Fig. 4.

Referring now more particularly to Fig. 1, there is shown at numeral 1 a housing having a waterproof roof 3 and swinging doors 5 and 7, the latter being adapted to be closed and locked at night or otherwise. The door 5 is provided with suitable hooks or catches for supporting lubricating equipment such as a hand gun 9, coupling hose 11, a nozzle 13 and other equipment including hand guns 15 and 17, of the nature of those set out in the following:

Barks United States Patent 1,939,943, dated December 19, 1933, for Lubricating apparatus, and Barks United States Patent No. 1,959,404, dated May 22, 1934, for Lubricating apparatus (file 7771).

On the door 7 are provided hooks or catches adapted to support other devices such as a spring spraying device 19, oil can 21, suction guns 23, wrenches 25, and clamp 27, as well as other devices which it is desired to support. It is obvious that when the doors are closed and locked at night, that these are automatically locked in.

The devices above referred to are adapted to be used in connection with such lubricating apparatus which is stored within the houses 1. When the nozzle 13 is not in position at the dotted lines on the left-hand door 5, it is adapted to be used at the end of an outlet hose 29 of a metering grease-pumping apparatus 31, shown as stored in said housing 1. For a full description of said apparatus 31, reference is made to Barks United States Patent 1,893,464, dated January 3, 1933, for Lubricating apparatus. The casters thereon permit of its movement for use exteriorly of the housing.

A second piece of drainage apparatus 33 is adapted to be stored within said housing 1. This apparatus consists simply in a drainage funnel on a portable container.

A third piece of apparatus 35 comprising a two-stage, high-pressure grease pump is described in Fox United States Patent 1,963,783, dated June 19, 1934 for Lubricating apparatus. This apparatus, like the others in the housing is provided with casters to permit movement. The movement in the case of apparatus 35 is for the purpose of permitting a change of grease containers exteriorly of the housing.

From the descriptions which appear in said respective disclosures, the pieces of apparatus 31 and 35 are known to require compressed air for putting them into operation, that is, they have pneumatic means for energizing them. No more detailed description of these apparatuses will be given in this application, because the said fact of their requiring compressed air for operation is primarily all that is necessary to be set forth herein.

In order to supply said compressed air in the most convenient manner, there is provided within the housing 1 an air pipe 37 which is permanently positioned and leads from a suitable compressor. This pipe has a cut-off valve 39 therein. Above the cut-off valve 39 this pipe leads into branches 41 and 43, said branches comprising flexible tubing (Fig. 3). The branches have at their ends swivel couplings each of which may be made according to Fox United States Patent 1,913,982, dated June 13, 1933, for Lubricating apparatus (file 7793). These couplings are numbered 45, 47 respectively.

The coupling 45 is for the purpose of making an air connection with the air inlet of the apparatus 35; whereas the coupling 47 is for the purpose of making an air connection with the air inlet of any tool from the doors 5 and 7 which it is desired to operate by air, such as the apparatus 15, 17, and 19, and also the apparatus 31 which requires air for its operation when used exteriorly of the housing 1. It is to be understood that the apparatus 35 being operable in the housing at substantially all times requires only a short, flexible line 41; whereas the coupling 47 which is to be applied to apparatus used exteriorly of the housing is provided with a long, flexible line 43. As is shown in my said Patent Number 1,913,982, the couplings 45, 47 are of the quick, detachable type. Referring to the apparatus 35 per se, it will be understood that it has a grease outlet 49 from which grease is delivered by means of the action of the compressed air coming into a suitable air motor and pump. The grease is under high pressure and is for use at the shackles and other points of lubrication to be found upon a motor car and requiring a heavy and/or viscous grease.

In order to effect a proper delivery of grease, I provide within the housing 1 a stand pipe or tower 51 which passes through the roof 3 and carries therein a grease pipe 53, the latter being adapted to receive in connection at its lower end the flexible line 55 leading from said grease outlet 49. Thus grease under pressure is forced into the pipe 53 by the air flowing to the supply and pumping apparatus 35.

Certain details of a swivel joint which is located at the upper end of the stand pipe 51 are shown in Figs. 4 to 6 and are described as follows:

A swivel head 57 is arranged at the end of the stand pipe 51 and carries a hood 59. The fixed pipe 53 is in the vertical center line of the head 57 so that said head swings about said pipe. This permits arranging an extension pipe 61 between a swivel gland 63 at the end of the pipe 53 and a fixed element of a gudgeon 65. By means of this pipe 61 grease under pressure is delivered to said gudgeon.

The gudgeon 65, with a second gudgeon 67 forms a horizontal bearing for rotatably supporting a spider 69. The spider 69 carries a rigid extension 71 within which is located a fixed pipe 73. A short length of pipe 75 reaches from an elbow 77 to a swiveling element 79 of said gudgeon 65. The element 79 swivels with respect to the gudgeon 65 and is protected against leakage by the packing 81. From the above it will be seen that the spider 69 may be rotated around a horizontal axis from the position shown in Fig. 4 to the position shown in Fig. 5. The surfaces 83, 85 effect a predetermined stop upon the downward movement.

Also, horizontal movement may be effected on a vertical axis in any of the various positions that may be assumed by the extension 71.

In order that any position of the extension 71 may be a substantially neutral one, I provide a counterbalancing mechanism comprising a spring 87 reacting between a washer 89 and an adjusting nut 91, the latter being on a sleeve 93, which sleeve is relatively movable with respect to the standpipe 51 and pipe 53.

A pair of connecting links 95 are pinned to the sliding sleeve 93 and also to the spider 69 so that when the spider is depressed, the sleeve 93 is drawn upwardly, thus compressing the spring 87. Upon release of the member 71, the tendency of the spring 87 to extend causes the spider 69 to be counterbalanced substantially, taking friction into consideration.

At the end of the pipe 73, there is provided a flexible grease hose 99, the same being coupled with said pipe 73 by means of a swivel joint 97. At the end of the hose 99 is a hand valve or gun 101 similar to those described in Barks Patent 1,733,441 of October 29, 1929, for Lubricating apparatus comprising a hand gun, or Linders Patent 1,812,798, of June 30, 1931, for Lubricating apparatus comprising a hand gun.

The operation of the handle 103 of the gun 101 results in permitting flow of grease from the gun 101 and release of the handle stops the flow. When flow starts, back pressure in the apparatus 35 is incipiently decreased and thus the supply of air coming in over pipe 37 automatically starts the operation of the apparatus 35 to maintain the pressure. When the handle 103 is released to close the valve 101, the incipient building up of pressure in the outlet line causes the apparatus 35 to cease functioning but pressure is maintained in the line. These particular matters will be clear from a reading of my said Patent 1,963,783, for Lubricating apparatus (file 8022).

From the above it will be seen that the gun 101 is available on a swiveling line and that it may be carried about the exterior of the housing 1 and used in connection with shackle fittings and the like to which it is desired to deliver grease under pressure. The counterbalancing feature permits of advantageous one-handed operation.

When a greasing operation is finished, the operator may let go of the gun, giving it a slight upward push and it will be positioned out of the way at or near said housing 1 to remain there.

In order that the gun 101 may be safe at night, I provide a notch 105 in the door 7 so that when the door is closed, the tubing 99 may be held in said notch 105, thereby placing the gun 101 within the housing from whence it cannot be withdrawn (Fig. 2).

At numeral 107 is shown a drawer for containing a lubricating chart and at 109 a drawer for fittings and other small parts.

By the term universal is herein meant a degree of flexibility permitting of reaching a substantial number of locations with the grease attachment 101.

The swivel glands in the head 57 and the swivel 97 are made to permit free movement under internal pressure without substantial leakage.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, a housing, portable lubricating apparatus adapted to be stored in said housing, compressed air piping within said housing including flexible extensions and means for attaching said extensions to said lubricating apparatus, said apparatus being used both within and without said housing and a lubricant delivery standard passing out of the housing, a flexible connection for effecting attachment between the lubricating apparatus in the housing and said standard, a universally swiveling conduit from said standard exteriorly of the housing, and a valve at the end of said conduit, said apparatus when attached by said connection being automatically operable to deliver lubricant when said valve is opened.

2. In apparatus of the class described, a standard, a swiveling head on said standard, a spider rotatable on said swiveling head about an axis normal to the axis of the swivel of said head, a pipe in the standard, a pipe associated with the spider and swiveling means placing said two pipes in communication, and means for normally counterbalancing the spider comprising a slidable member within the standard, a spring normally pressing said slidable member, and connecting means between the slidable member and said spider.

3. In apparatus of the class described, a standard, a swiveling head on said standard, a spider rotatable on said swiveling head about an axis normal to the axis of the swivel of said head, a pipe running through the standard to the head, a pipe associated with the spider and swiveling means placing said two pipes in communication, and means for normally counterbalancng the spider and associated parts comprising a slidable member within the standard and positioned around the pipe therein, a spring normally pressing said slidable member and connecting means between the slidable member and said spider, said communicating means between the pipes comprising a swivel connection between the first-named pipe and a fixed point on the head and swivel means connecting the spider and said head.

4. In apparatus of the class described, a standard, a swiveling head on said standard, a spider rotatable on said swiveling head about an axis normal to the axis of the rotation of said head, a pipe running from the standard to the head, a pipe associated with the spider and swiveling means placing said two pipes into communication, and means for normally counterbalancing the spider and its parts comprising a slidable member within the standard, a spring normally pressing said slidable member, connecting means between the slidable member and said spider, said communicating means between the pipes comprising a swivel connection between the first-named pipe and a fixed point with respect to the head and swivel means between the spider and said head.

5. In lubricating apparatus of the class described, portable lubricant compressing means, a housing adapted to cover said compressing means, pneumatic means energizing said compressing means and carried therewith, compressed air piping in said housing, a detachable connection for connecting said piping to said pneumatic means, whereby said compressing means is made operable to compress lubricant, lubricant delivery means extending from said housing, and a detachable connection from said lubricant delivery means to said lubricant compressing means adapted to deliver lubricant from said compressing apparatus to said delivery means.

6. In lubricating apparatus of the class described, portable lubricant compressing means, a housing adapted to cover said compressing means, pneumatic means energizing said compression means and carried therewith, compressed air piping in said housing, a flexible, detachable connection for connecting said piping to said pneumatic means whereby said compressing means is made operable to compress lubricant, lubricant delivery means extending from said housing, a flexible, detachable connection from said lubricating means to said lubricant compressing means adapted to deliver lubricant from said compressing apparatus to said delivery means, and a swiveling extension associated with said delivery means having an outlet for connection with lubricant receiving fittings and adapted to clear the housing when in operative connection with said fittings.

7. In lubricating apparatus of the class described, portable lubricant compressing means, a housing adapted to cover said compressing means, pneumatic means energizing said compressing means and carried therewith, compressed air piping in said housing, a flexible detachable connection for connecting said piping to said pneumatic means whereby said compressing means is made operable to compress lubricant, lubricant delivery means extending from said housing, a flexible, detachable connection from said delivery means to said lubricating apparatus within the housing and adapted to deliver lubricant from said compressing apparatus to said delivery means, a rigid swiveling arm associated with said extension, flexible outlet means at the end of said arm, and a valve at the end of said flexible means, said arm and flexible outlet means being adapted to clear said housing as the arm swivels.

ALEXANDER P. FOX.